(12) United States Patent
Demanet

(10) Patent No.: US 6,467,249 B2
(45) Date of Patent: Oct. 22, 2002

(54) HAY MAKING MACHINE COMPRISING AT LEAST ONE RAKING WHEEL ARTICULATED TO A CARRYING ARM

(75) Inventor: Didier Demanet, Saint-Louis (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/824,091

(22) Filed: Apr. 3, 2001

(65) Prior Publication Data

US 2001/0025473 A1 Oct. 4, 2001

(30) Foreign Application Priority Data

Apr. 4, 2000 (FR) .............................. 00 04250

(51) Int. Cl.$^7$ .............................................. A01D 78/10
(52) U.S. Cl. ............................. 56/377; 56/367; 56/370; 56/375
(58) Field of Search ...................... 56/344, 345, 350, 56/354, 365, 366, 367, 370, 375, 376, 377, 378, 379, 380, 384, 396, 397, DIG. 10

(56) References Cited

U.S. PATENT DOCUMENTS

| | | | | | |
|---|---|---|---|---|---|
| 2,832,189 A | * | 4/1958 | McIntyre | ...................... | 56/370 |
| 4,245,457 A | * | 1/1981 | Gerlinger | ...................... | 56/367 |
| 4,914,901 A | * | 4/1990 | Aron | ............................ | 56/370 |
| 4,922,700 A | * | 5/1990 | Aron | ............................ | 56/367 |
| 4,926,619 A | * | 5/1990 | Ungruh et al. | ................. | 56/370 |
| 5,274,990 A | | 1/1994 | Aron et al. | | |
| 5,685,136 A | * | 11/1997 | Aron | ............................ | 56/367 |
| 5,862,659 A | * | 1/1999 | Aron | ............................ | 56/367 |

FOREIGN PATENT DOCUMENTS

| | | | |
|---|---|---|---|
| DE | 28 33 814 A1 | 2/1980 | |
| DE | 3835366 A1 | 10/1989 | |
| DE | 4142000 A1 * | 6/1993 | .......... A01B/63/16 |
| EP | 0069857 A1 * | 3/1982 | |
| EP | 0 642 733 A1 | 3/1995 | |
| EP | 0 954 956 A1 | 11/1999 | |

* cited by examiner

*Primary Examiner*—Thomas B. Will
*Assistant Examiner*—Nathan Mammen
(74) *Attorney, Agent, or Firm*—Oblon, Spivak, McClelland, Maier & Neustadt, P.C.

(57) ABSTRACT

A hay making machine, particularly a windrower for plant matter, comprising a structure carrying at least one raking wheel. The latter is connected to the end of a carrying arm in such a way as to be able to pivot about a first axis and a second axis. The two axes of articulation of the raking wheel to the carrying arm form angles α and β, the values of which are between 10° and 80°, with the direction of forward travel of the machine.

8 Claims, 3 Drawing Sheets

HAY MAKING MACHINE COMPRISING AT LEAST ONE RAKING WHEEL ARTICULATED TO A CARRYING ARM

BACKGROUND OF THE INVENTION

1. Field of the Invention

The present invention relates to a hay making machine, particularly a windrower for plant matter lying on the ground, comprising a structure carrying at least one raking wheel which is connected to the end of a carrying arm in such a way as to be able to pivot about a first axis and a second axis which form angles of about 90° with one another, which raking wheel is equipped with arms with working tools and can be driven in rotation about an approximately vertical support axis which is equipped at its lower end with support wheels.

2. Discussion of the Background

In known machines of this kind, the first axis of articulation between the raking wheel and its carrying arm is directed in the direction of forward travel and the second articulation axis is perpendicular to the direction of forward travel.

These articulation axes allow the raking wheel to pivot with respect to the carrying arm to follow the unevennesses of the ground during work. The quality of the raking is thus considerably improved.

For transport, the raking wheel is lifted up using the carrying arm through an angle of about 90°. In this position it is approximately vertical, which makes it possible to reduce the width of the entity and bring it inside the maximum width permissible for road transport. In this position, it is, however, necessary to immobilize the raking wheel so that it can no longer pivot about said articulation axes, particularly about the second axis which is then approximately vertical, during travel along paths or roads. As a result of such pivotings, the tools of the raking wheel could extend beyond the maximum permitted width and present a risk of catching on objects or people possibly located nearby.

These locking means increase the price of the machine. In addition, if they are mounted or removed manually by the user, the user may forget to carry out this operation.

SUMMARY OF THE INVENTION

An object of the present invention is to overcome the aforementioned drawbacks of the known machines. The present invention must, in particular, make it possible to obtain, in a very simple way and for a very low cost, automatic immobilization of the raking wheel during transport.

To this end, one important feature of the invention consists in the fact that the two axes of articulation between the raking wheel and the carrying arm form angles with the direction of forward travel of the machine, the values of which are between about 10° and 80°. It is important that neither of these axes forms a right angle with said direction of forward travel. Said angles may advantageously have the same value, namely 45°.

By virtue of this position of the two articulation axes, the raking wheel is automatically immobilized under the effect of its own weight when raised into the transport position. As a result of this, it is no longer necessary for the machine to be fitted with a device for locking the raking wheel or with means for operating such a device upon each switch from the work position to the transport position and vice versa. The risk of the immobilizing of the raking wheel being forgotten is also eliminated.

According to other features of the invention, the raking wheel is articulated to the first axis by means of two cramps which allow it to pivot about said first axis. The second axis is articulated in cramps of the carrying structure so as to be able to pivot with respect to said structure. The first axis is guided at least at one of its ends in an oblong orifice made in a tab of the carrying structure. The second axis is guided at least at one of its ends in an oblong orifice provided in a tab of the raking wheel. These oblong orifices in a simple way limit the angles of pivoting of the raking wheel about the two articulation axes so as to avoid excessive movements which could be harmful to the quality of the raking work and give rise to damages.

BRIEF DESCRIPTION OF THE DRAWINGS

Other features and advantages of the invention will become apparent from the description which will follow and which refers to the appended drawings which, by way of nonlimiting example, represent one embodiment of the invention.

In these drawings.

DESCRIPTION OF THE PREFERRED EMBODIMENTS

Figure 1:
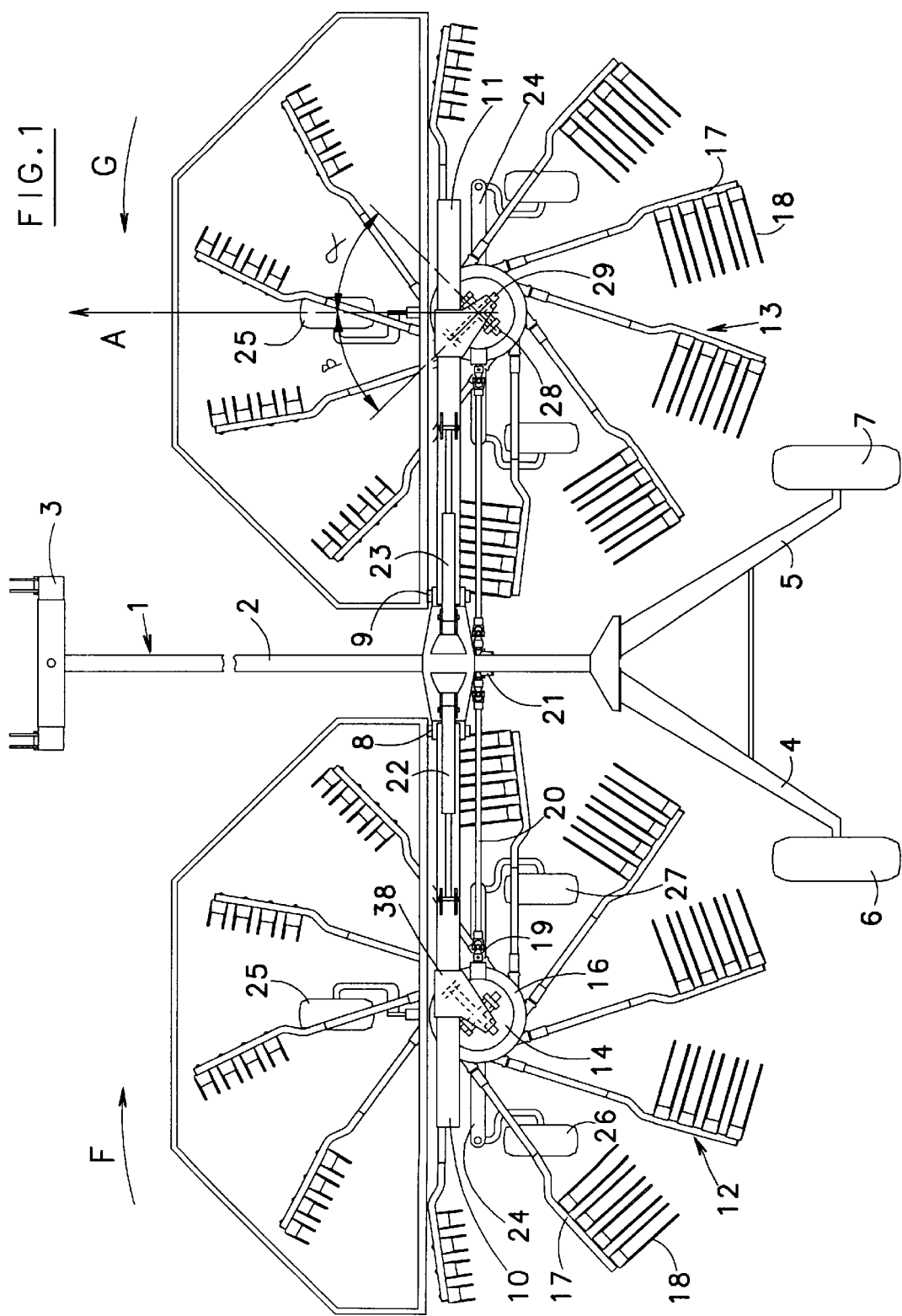
FIG. 1 depicts a top view of a machine according to the invention in the work position.

As depicted in the appended figures, the machine according to the invention comprises a carrying structure 1. This consists in particular of a central beam 2 which is approximately horizontal. This beam 2 at its front end has a coupling device 3 for hitching it to a tractor so that it can be moved in a direction of forward travel A. At its rear end it has two diverging girders 4 and 5 each having a carrying wheel 6 and 7 which runs over the ground. On each side of the beam 2 is articulated, by means of an approximately horizontal axis 8, 9, a lateral arm 10, 11 which carries a raking wheel 12, 13. The beam 2 could have just one single lateral arm and one single raking wheel. Equally, it could, on each side, have two lateral arms of different lengths each carrying a raking wheel. In this case, the machine would have four raking wheels which would allow it to cover a greater working width.

The raking wheels 12 and 13 are approximately identical. Each comprises a casing 14 in which an approximately vertical support axis 15 is fixed. Under this casing 14 is a box 16 with arms 17 which extend outward and are fitted with working tools 18 such as forks. This box 16 is mounted on the support axis 15 in such a way as to be able to rotate thereon. The tool-carrying arms 17 are guided in bearings secured to the box 16 so that they can pivot about their respective longitudinal geometric axes. Inside this box 16 there is an operating cam fixed to the support axis 15. Each tool-carrying arm 17 comprises, at its end located inside the box 16, a lever with a roller which is guided in said cam. The machine according to the invention could equally be fitted with raking wheels with unoperated working tools.

Inside the casing 14 of each raking wheel 12, 13 there are means for driving the box 16 in rotation about the support axis 15. These means consist of a toothed ring which is secured to the upper part of the box 16 and of a drive pinion which meshes with said toothed ring. This pinion is connected to a shaft 19 which extends out of the casing 14 toward the beam 2. Connected to this shaft 19 is a transmission shaft 20 with a universal joint near each of its ends. This transmission shaft 20 is connected to a distribution box 21 fixed under the beam 2 and which is connected by other transmission shafts to the tractor power take-off. The box 16 of each raking wheel 12, 13 could equally be driven in rotation using hydraulic motors.

The carrying arm 10, 11 of each raking wheel 12, 13 is equipped with a hydraulic ram 22, 23 which allows it to be raised into an approximately vertical position about its articulation axis 8, 9. Each hydraulic ram 22, 23 is articulated with one of its ends to the beam 2 and with its other end to the corresponding arm 10, 11.

The support axis 15 of each raking wheel 12, 13 is equipped at its lower end with a cross-beam 24 with three support wheels 25, 26, 27. One wheel 25 is located forward of the support axis 15 while two wheels 26 and 27 are located behind said support axis 15. In addition, they are located near to the working tools 18 so as to cause them to follow the surface of the ground closely.

The casing 14 of each raking wheel 12, 13 is articulated with respect to the corresponding carrying arm 10, 11 by means of a first axis 28 and a second axis 29 which form angles of about 90° with one another. These two axes 28 and 29 also form angles α and β, the values of which may be between about 10° and 80°, with the direction of forward travel A of the machine (see FIG. 1). As in the example depicted, the values of the angles α and β are advantageously approximately 45°. These two axes 28 and 29 cross and are joined together to form a crosspiece. They may, however, also be offset heightwise one with respect to the other and joined together.

Figure 3:
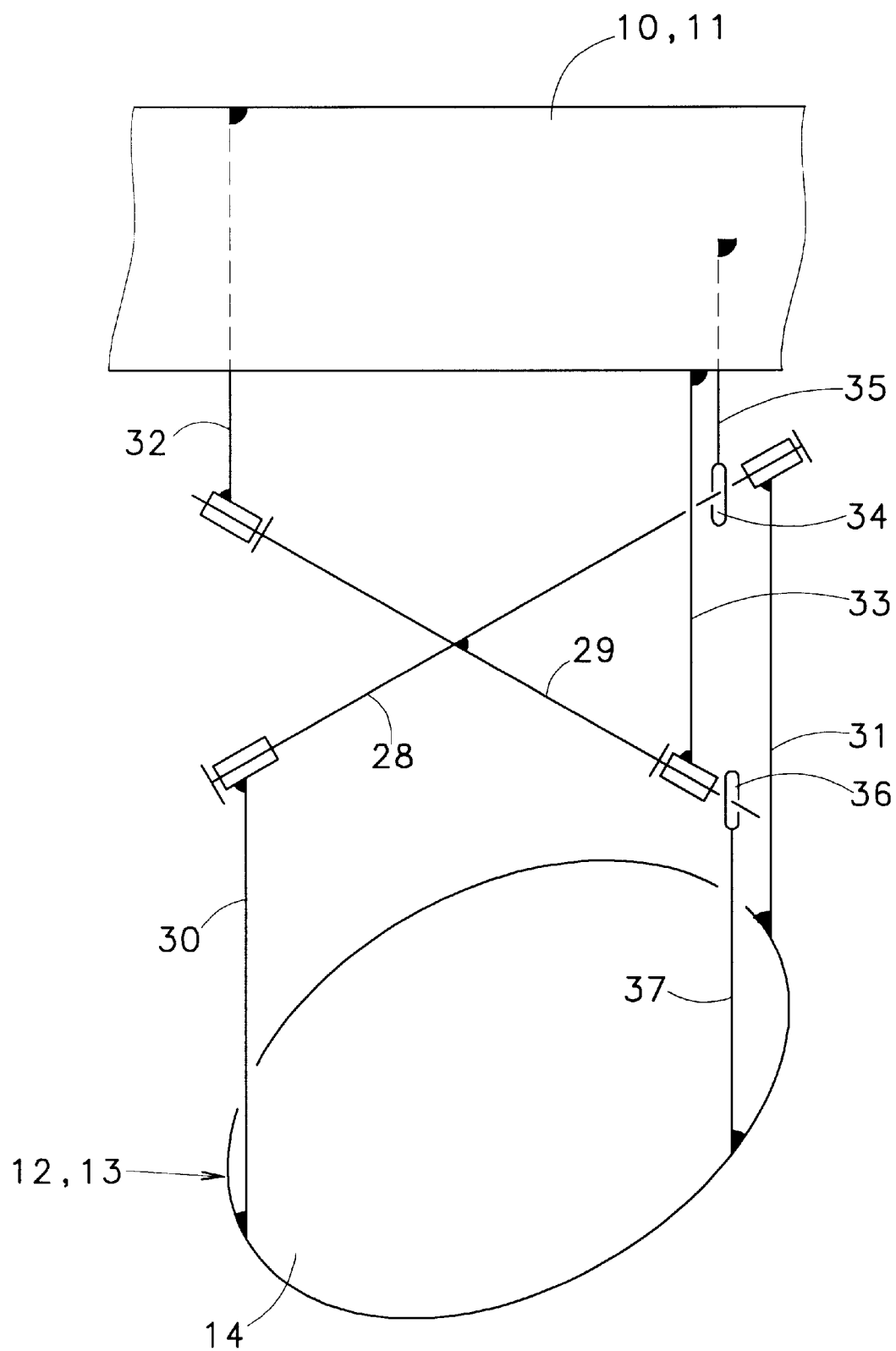

As is apparent, in particular, from FIG. 3, the casing 14 of each raking wheel 12, 13 has cramps 30 and 31 which are directed upward and which are articulated to the first axis 28. The second axis 29 is articulated to the arm 10, 11 of the carrying structure 1 by means of cramps 32, 33 which are connected to said arm 10, 11 and directed downward. The pivoting of each raking wheel 12, 13 with respect to its carrying arm 10, 11 in the work position is limited. For this purpose, the first axis 28 is guided at least at one of its ends in an oblong orifice 34 provided in a tab 35 secured to the carrying arm 10, 11. The length of this orifice 34 determines the angle of pivoting of the raking wheel 12, 13 about the second axis 29. Said second axis 29 is also guided at least at one of its ends in a second oblong orifice 36 provided in a tab 37 secured to the casing 14 of the raking wheel 12, 13. The length of this second orifice 36 determines the angle of pivoting of the raking wheel 12, 13 about the first axis 28.

Figure 2:
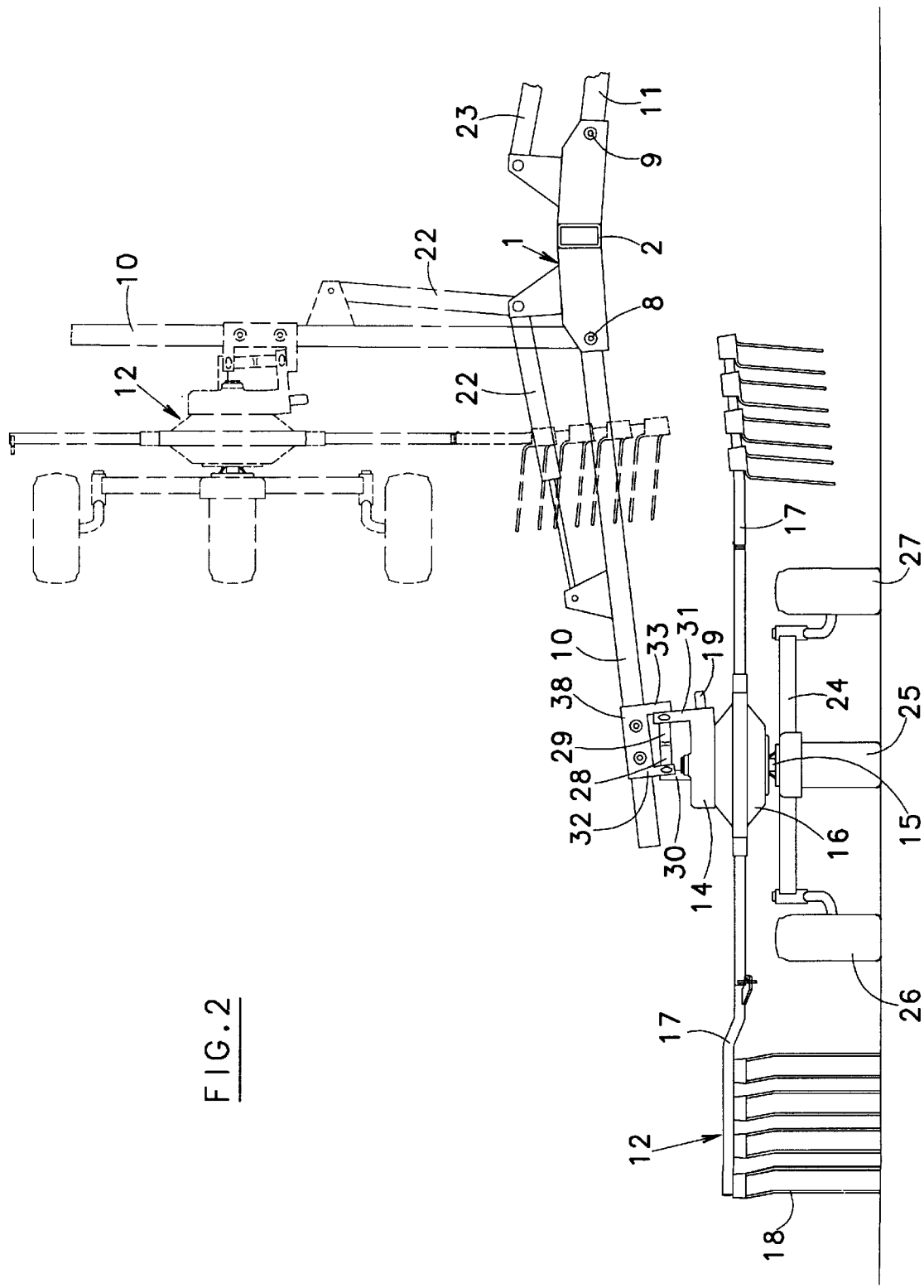
FIG. 2 depicts, on a larger scale, a rear view of a raking wheel of the machine according to the invention, FIG. 3 schematically depicts the connection between a raking wheel and its carrying arm.

As is apparent from FIGS. 1 and 2, each raking wheel 12, 13 can be connected to a frame 38 that can move along the corresponding carrying arm 10, 11. This frame 38 is designed to be able to slide along its carrying arm 10, 11 and to be able to be immobilized, for example using screws, in various positions. In this embodiment, the articulation cramps 32 and 33 of the second axis 29 and the guide tab 35 of the first axis 28 are secured to said frame 38. This arrangement allows the spacing between the two raking wheels 12 and 13 to be varied, particularly in order to adapt the width and volume of the windrow to the harvesting machine which has to gather it.

During work, the machine according to the invention is coupled to a tractor which moves it along in the direction of the arrow A. The two carrying arms 10 and 11 are therefore lowered so that the wheels 25, 26 and 27 of the two raking wheels 12 and 13 rest on the ground. The boxes 16 of these raking wheels 12 and 13 are driven in rotation in the direction of arrows F and G from the tractor power take-off. During this rotation, the tool-carrying arms 17 of each raking wheel 12, 13 are operated by the cam housed in the corresponding box 16 so that their tools 18 are close to the ground and rake the plant matter on the forward part of their path. Thereafter, they move away from the ground and deposit this plant matter in the form of a windrow along the strip of land located between the two raking wheels 12 and 13. The width of this windrow can be adjusted by moving the frames 38, with the raking wheels 12 and 13, along the carrying arms 10 and 11.

When the machine is working on land with obstacles and a support wheel 25, 26 or 27 encounters a bump, it causes the corresponding raking wheel 12, 13 to pivot about the first axis 28 and/or the second axis 29. These axes 28 and 29 thus give the raking wheel 12, 13 a great deal of mobility with respect to its carrying arm 10, 11. This mobility prevents the tools 18 from scraping the ground or from being momentarily separated from the ground by too great a distance. Thus, these tools 18 remain constantly close to the ground in the raking zone and correctly pick up all the plant matter. Said pivotings are, however, limited by the end of the first axis 28 or second axis 29 coming into abutment against the end of the corresponding oblong orifice 34 or 36. This limitation makes it possible to avoid excessive movements which could cause the tool-carrying arms 17 to collide with the carrying structure 1.

For transport, the rotational drive to the raking wheels 12 and 13 is stopped and the two carrying arms 10 and 11 are raised up about the axes 8 and 9 into an approximately vertical position by means of the hydraulic rams 22 and 23 (the position depicted in chain line in FIG. 2). In this position, the first axis 28 and the second axis 29 of each raking wheel 12 and 13 form angles of about 45° with respect to the horizontal. Because of the weight of the raking wheels 12 and 13, said first and second axes 28 and 29 automatically come into abutment against the ends of the oblong orifices 34 and 36. They then prevent the raking wheels 12 and 13 from pivoting with respect to their carrying arms 10 and 11. As a result, there is no longer any risk of these raking wheels 12 and 13 temporarily extending beyond the overall size of the machine. Said raking wheels 12 and 13 automatically regain their mobility about the axes 28 and 29 when they are returned to the work position.

Quite obviously, the invention is not restricted to the embodiment described hereinabove and depicted in the appended drawings. Modifications are possible, particularly as regards the construction or number of the various elements, or by substituting technical equivalents, without in anyway departing from the field of protection.

What is claimed as new and desired to be secured by Letters Patent of the United States is:

1. A hay making machine, for windrowing plant matter lying on the ground, comprising:

a structure having at least one lateral arm articulated to said structure by an approximately horizontal axis and carrying at least one raking wheel connected to an end of said carrying arm to be pivotable about a first axis and a second axis that form angles of about 90° with one another, wherein the raking wheel is equipped with arms with working tools and is configured to be driven in rotation about an approximately vertical support axis equipped at its lower end with support wheels, wherein said first and second axes of the raking wheel to the carrying arm form angles α and β, values of which are between about 10° and 80°, with a direction of forward travel of the machine and form same angles α and β with respect to horizontal when the rotor and the carrying arm are raised up about the approximately horizontal axis into an approximately vertical position for transport.

2. Machine as claimed in claim 1, wherein the values of the angles α and β are about 45°.

3. Machine as claimed in claim 1, wherein the two first and second axes are connected together and form a crosspiece.

4. Machine as claimed in claim 1, wherein the raking wheel is articulated to the first axis by two cramps connected to a casing of the raking wheel.

5. Machine as claimed in claim 4, wherein the second axis is articulated to the carrying structure by cramps connected to the arm of the structure.

6. Machine as claimed in claim 4, wherein the first axis is guided at least at one of its ends in an oblong orifice made in a tab of the structure.

7. Machine as claimed in claim 5, wherein the second axis is guided at least at one of its ends in an oblong orifice made in a tab of the raking wheel.

8. Machine as claimed in claim 5, wherein the cramps of the second axis and a guide tab for the first articulation axis are secured to a frame that can be moved along the arm of the carrying structure.

* * * * *